United States Patent
Bourreau et al.

[11] Patent Number: 5,401,534
[45] Date of Patent: Mar. 28, 1995

[54] PROCESS AND APPARATUS FOR CONTINUOUS TREATMENT OF PARTICLES

[75] Inventors: Frank-Yann Bourreau, Boissy le Sec; Christophe Seimandi, St Germain-les-Arpajon, both of France

[73] Assignee: Rhone-Poulenc Agrochimie, Lyons Cedex, France

[21] Appl. No.: 32,285

[22] Filed: Mar. 17, 1993

[30] Foreign Application Priority Data

Mar. 17, 1992 [FR] France ................ 92 03424

[51] Int. Cl.⁶ ............................................. B05D 7/00
[52] U.S. Cl. .................. 427/212; 427/211.2; 427/425; 118/303; 118/418
[58] Field of Search ............ 427/242, 212, 425; 118/418, 303

[56] References Cited

U.S. PATENT DOCUMENTS

| | | | |
|---|---|---|---|
| 2,601,355 | 6/1952 | Wyss et al. | 118/303 |
| 2,999,293 | 9/1961 | Taff et al. | 25/156 |
| 3,974,307 | 8/1976 | Bowen | 427/242 |
| 4,862,826 | 9/1989 | Christen | 118/303 |
| 5,094,604 | 3/1992 | Chavez et al. | 425/222 |

FOREIGN PATENT DOCUMENTS

| | | |
|---|---|---|
| 1459246 | 11/1966 | France . |
| 922267 | 1/1955 | Germany . |
| 9107415 | 9/1991 | Germany . |
| 661669 | 8/1987 | Switzerland . |

*Primary Examiner*—Shrive Beck
*Assistant Examiner*—David M. Maiorana
*Attorney, Agent, or Firm*—Burns, Doane, Swecker & Mathis

[57] ABSTRACT

Particles, such as seeds, are coated with a treatment agent by being introduced into a rotating cylindrical drum into which the treatment agent is supplied. A pair of screw conveyors is disposed within the drum and arranged to rotate about respective axes oriented parallel to the axis of rotation of the drum. One of the screw conveyors rotates in the same direction as the drum, and the other screw conveyor rotates in the opposite direction to achieve a rolling motion of the particles as they are axially advanced along the drum.

19 Claims, 2 Drawing Sheets

PROCESS AND APPARATUS FOR CONTINUOUS TREATMENT OF PARTICLES

BACKGROUND OF THE INVENTION

The present invention relates to a process for the continuous treatment of particles by means of a treatment agent, as well as a device for implementing this process.

It is known to treat particles continuously by means of a solid or liquid treatment agent so as to coat them or wrap them in a surface layer for various applications. The problem to be solved in this type of technique resides in the desire both to obtain a treatment which is as uniform and even as possible and to perform the treatment economically.

In this field, processes and apparatuses have been proposed in which the particles, as well as the treatment agent previously supplied with the particles, are made to progress along the bottom of a stationary trough using a longitudinal brush coaxial with the bottom of the trough and tangent through at least one of its generatrices to the bottom of the said trough. Although this technique provides an improvement over the techniques of the prior art, it nevertheless exhibits the drawback of not affording a sufficiently uniform distribution of the treatment agent on the particles and of requiring a relatively long piece of equipment in order to obtain a satisfactory effect.

Another device has more recently been proposed, in which the principal part is a drum driven in slow rotation, in which there is disposed a brush, with a parallel but off-centered axis, rotating in a direction opposite to that of the rotation of the drum, so as to give better agitation to the particles and further to improve the uniformity of the covering of the particles.

However, these techniques still remain deficient, when it is desired to obtain a high quality of the covering in combination with high productivity.

The aim of the present invention is to overcome these drawbacks and to provide a process and a device for continuous treatment of particles combining both an excellent quality of covering and an improved productivity.

SUMMARY OF THE INVENTION

The present invention relates to a process for treating the surface of particles with a treatment agent. The process comprises the steps of supplying the treatment agent into a chamber, introducing the particles into the chamber, and continuously moving a plurality of walls in contact with the particles for feeding volumes of the particles continuously in a first direction while subjecting the particles to a rotational movement transversed to the first direction and simultaneously to a vertical movement.

The present invention also relates to an apparatus for treating particles with a treatment agent. The apparatus comprises a cylindrical drum rotating about a substantially horizontal longitudinal first axis. The drum has an inlet through which particles are supplied, and an outlet through which particles are removed. A distributing mechanism distributes the treatment agent into the drum. A displacement mechanism displaces the particles from the inlet to the outlet. The displacement mechanism includes first and second screws disposed within the drum and rotating about second and third axes, respectively disposed substantially parallel to the first axis. The first and second screws rotate in opposite directions to transfer particles between one another as the particles are subjected to the treatment agent.

BRIEF DESCRIPTION OF THE DRAWINGS

The objects and advantages of the invention will become apparent from the following detailed description of a preferred embodiment thereof in connection with the accompanying drawing in which like numerals designate like element and in which.

DETAILED DESCRIPTION OF A PREFERRED EMBODIMENT OF THE INVENTION

Figure 1:
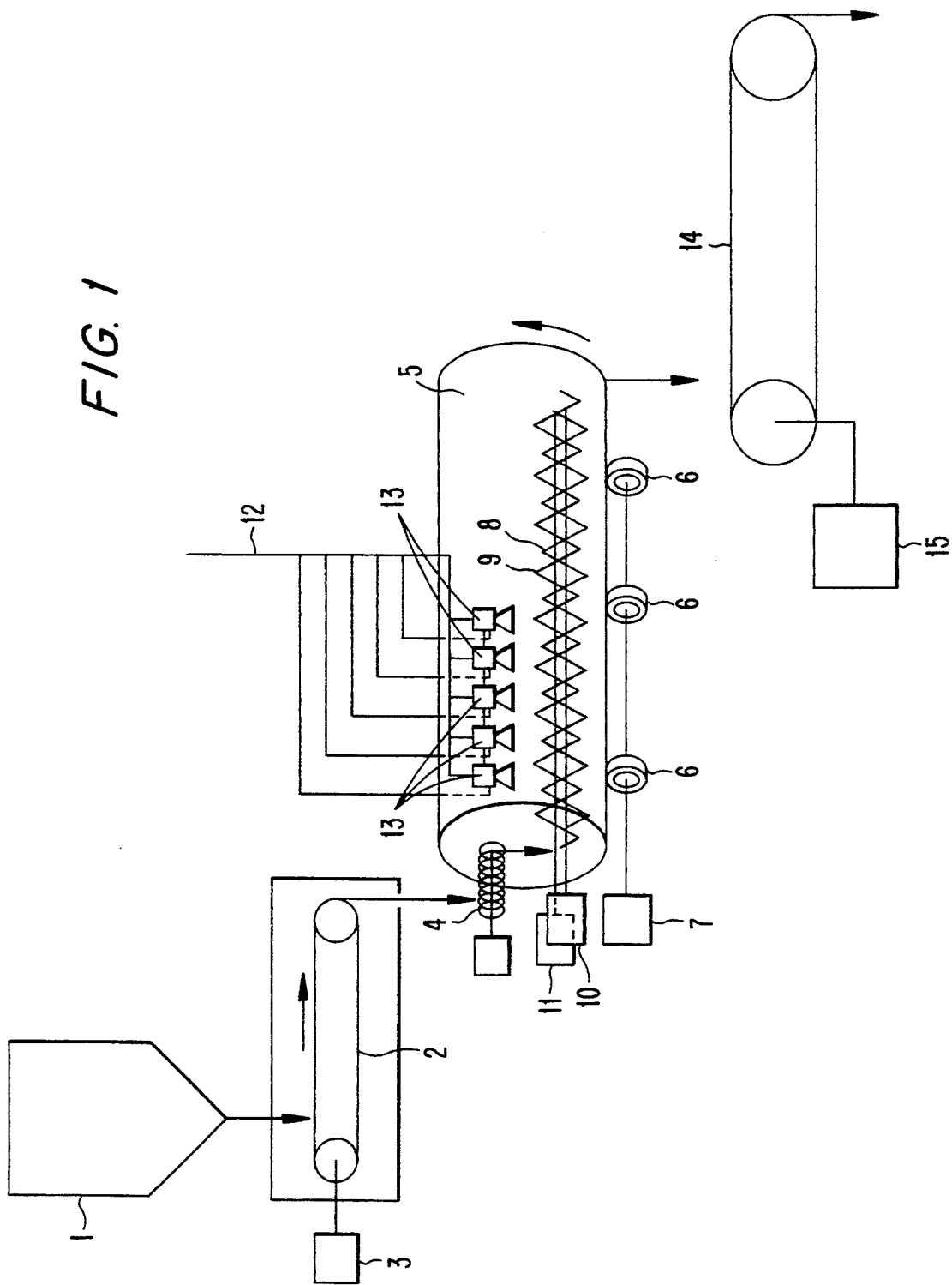
FIG. 1 is a schematic side elevational view of the treatment apparatus according to the present invention.

According to the present invention there is provided a process for the continuous surface treatment of particles by means of a treatment agent. The treatment agent is supplied simultaneously and continuously. Volumes of particles are fed continuously in a first direction through a chamber and particles forming the volumes are simultaneously subjected to at least one rotational motion in a direction transverse to the first direction and to at least one vertical motion. The volumes of particles are delimited by walls which contact the particles and which are continuously moving.

The expression "substantially horizontal" is herein defined as disposed at any angle between truly horizontal and 30° to truly horizontal.

Advantageously the rotational motion is a rolling motion of the individual particles.

Preferably, each volume of particles is delimited by at least one principal circular or polygonal inside wall of a cylindrical drum, engaged in slow rotation around a longitudinal axis and at least two secondary walls moving rectilinearly in the direction of the principal translational notion of the particles.

For convenience, at least two of the secondary walls are substantially parallel to each other and comprise two successive homologous parts, i.e., parts of a screw which lies tangent to at least one generatrix of the principal rotating wall.

In particular, the secondary walls comprise two screws with axes oriented parallel to the axis of the principal rotating wall. The secondary walls may include lengths of brushes.

The treatment agent may be solid, for example a powder, or liquid, for example a solution, emulsion or dispersion in particular of film-forming materials and/or of adhesive materials, and may be supplied onto the elemental volumes of particles by any suitable means situated inside the drum, such as a pourer or inclined conveyor belt, in the case of a solid agent, or one or more spray pipes, in the case of a liquid agent. Preferably, in order to ensure a high quality of treatment on exit from the drum, the treatment agent is applied onto the elemental volumes, in the first part of their translational travel over the principal wall.

The particles are supplied and tipped at the entry of the cylindrical drum by any suitable device, such as a pourer or inclined conveyor belt and may have undergone a pretreatment, such as for example wetting or supplying of a binding substance. Preferably, this pretreatment may be produced in a device according to the invention.

At the exit from the treatment drum the treated particles may be removed by any suitable device, such as for example a conveyor belt in order to be stored directly. Preferably, this conveyor belt forms part of or feeds a unit for preferably continuous drying.

The process according to the invention is applicable to all sorts of particles, such as, for example, seeds, centers for sweets, dragees, tablets, biscuits or the like and more generally to any particles of average size ranging from a few mm to 3 cm.

A device for carrying out the process comprises a longitudinal drum rotating around a substantially horizontal axis, means for continuously supplying particles at the entry of the drum and a displacement device to cause the particles to progress from one end of the drum to the other. Provided within the drum are:

a) at least two longitudinal screws rotating around axes oriented parallel to that of the drum, at least one rotating in the same direction as the drum, and the other (or others) in the opposite direction, and b) at least one feeding pipe, whose axis is substantially parallel to that of the drum, associated with at least one distributor for distributing the treatment agent onto the particles while in motion, along the whole treatment zone of the drum.

The drum is a cylinder, possibly perforated, of circular or polygonal cross-section.

Preferably, the feeding pipe is situated above the axes of the longitudinal screws. The distributor of the treatment agent may be a spray nozzle, if the treatment agent is a liquid, or a solid dispenser for example if the agent is a powder.

The device according to the invention may be included in a treatment line for particles usually comprising a continuous transportation device for removing the treated particles. The transportation device may be associated with or form part of a unit for drying the treated particles.

Figure 2:
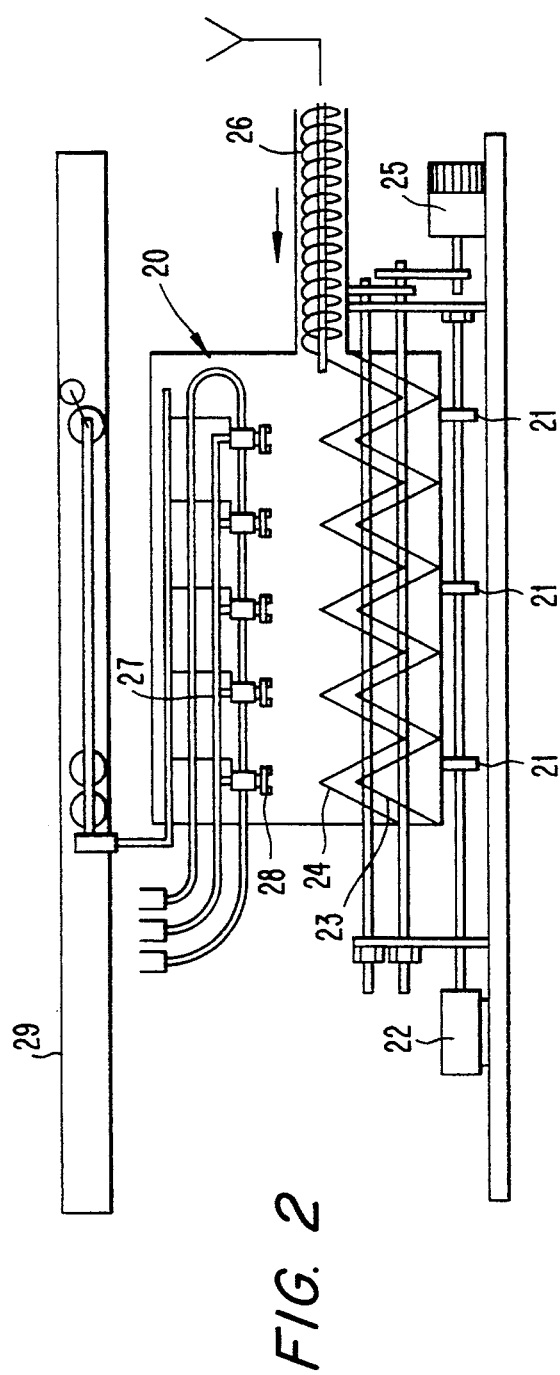
FIG. 2 is a view similar to FIG. 1 depicting the apparatus more specifically.
Figure 3:
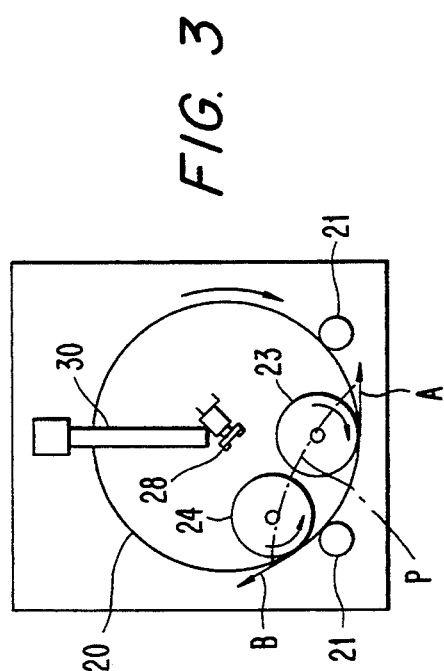
FIG. 3 is an end view of the apparatus depicted in FIG. 2, with the drive motor and particle feeder removed.

Shown in FIG. 1 is a schematic representation of an apparatus according to the present invention which is more particularly described with respect to FIGS. 2 and 3. The apparatus includes a device 1 for storing the particles to be treated. These are poured under gravity onto a metering conveyor belt 2 driven, towards the right, by a regulated motor 3 which conveys the particles and drops them into a pourer 4, which in turn pours the particles through the inlet of a cylindrical drum 5. The drum is rotating in the direction indicated by the arrow, upon rollers 6, and is driven around an axis by a motor 7. The cylinder 5 is shown as horizontal, but may in particular be inclined upwards by up to 30°, in the direction of advance of the particles. The drum wall could be solid, or perforated.

Inside the cylinder 5 and at its lower part are installed two helicoid brushes 8 and 9 having axes oriented parallel to that of the cylinder and mounted so as to be rotatably driven by motors 10 and 11 tangentially, by at least one generatrix, to a generatrix of the cylinder, so that there exists an imaginary line which is tangent to both the radius of the drum and the radius of the brush 8, as the brush and drum are viewed in cross section. The same is true of the drum and brush 9. The brush 8 rotates in the same direction as the cylinder, but the brush 9 rotates in the reverse direction. The respective speeds are chosen so that the particles passing along the bottom of the cylinder in rotation are sent from one brush to the other, creating between the internal surfaces of their respective lengths and the rotating wall of the cylinder, a plurality of elemental particle volumes subjected to a translation along the cylinder and motions causing these particles to rotate over all their faces.

Still inside the drum but situated above the brushes is mounted a feeding device comprising a pipe 12 for feeding a liquid treatment agent associated with a series of spray nozzles 13. The assembly is disposed longitudinally substantially parallel to the axis of the cylinder. When the particles pass through the treatment zone of the cylinder the nozzles spray the treatment agent downwardly onto them. By virtue of the rolling motion of the particles, the treatment agent is distributed over the entire surface of each particle in a particularly homogeneous manner.

The particles may then leave the cylinder directly or leave it only after passing through an extension of the drum not provided with a device for dispensing the treatment agent, which has the effect of perfecting the homogeneity of covering of the particles. However, this effect may also be obtained by passing the treated particles through a similar or different continuous transportation and stirring system.

At the exit, the treated particles are poured or taken up by a conveyor belt 14 driven by a motor 15 which can convey them directly towards a packaging unit or, if drying is necessary, towards a preferably continuous drying unit. Advantageously, the conveyor belt itself forms part of a continuous dryer, which allows a particularly compact and productive complete installation to be obtained.

FIG. 2 depicts the apparatus more specifically. The cylinder 20 is driven in rotation the by the rollers 21, themselves driven by the motor 22. The brushes 23 and 24 are driven by a common motor 25, but, through a set of pinions, in mutually different directions. The brush 23 rotates in the same direction as the cylinder, and the brush 24 rotates in the opposite direction, but the helical winding direction of brush 24 is opposite that of brush 23 so that both brushes advance particles in the same axial direction. The particles are continuously supplied by the screw conveyor 26, in the direction indicated by the arrow. In the upper part of the cylinder and over practically all of its length, there is mounted a feeding pipe 27 associated with a series of nozzles 28, the assembly being mounted so as to slide by rigid attachment with a moving carriage 29. This arrangement allows easier access and cleaning for the elements of the device.

FIG. 3 is an end view of FIG. 2, without the motors or the sliding carriage being shown. The cylinder 28 rotates on rollers 21. The brushes 23 and 24 rotate in mutually different directions; brush 23 rotates in the same direction as the cylinder 5. An imaginary line A is tangent to both the drum wall (i.e., the main wall) and the brush 23; an imaginary line B is tangent to both the drum wall and the brush 24. The feeding pipe 27 associated with the nozzle 28 is disposed in the upper part of the drum. Particles are advanced axially by the two brushes 23, 24, with an axial quantity of particles being delimited by the walls of the brushes and the inside wall of the drum. That quantity comprises a plurality of volumes defined between the opposing helical turns of the brushes. Thus one 360° turn of brush 23, plus one 360° turn of brush 24, and plus the drum wall forms a volume of particles, there being a number of such particles extending axially along the drum. The profile P of a volume of particles is depicted in phantom lines in FIG. 3.

Each of the brushes 23, 24 advances particles in an exiting direction toward the outlet and of the drum. In so doing, the brush 23 kicks the particles laterally and vertically toward the brush 24, and the brush 24 kicks the particles laterally and vertically back to the brush 23, thereby effecting a rolling motion of the particles to repeatedly expose the surfaces thereof to the treatment agent, as well as increasing the dwell time of the particles within the drum. The rotation of the drum amplifies the rolling motion of the particles.

Without needing to enter into details, it is to be understood that the power sources of all the elements of the device described hereinabove are equipped with conventional regulating devices, so as to ensure a regular flow rate of the treatment agent as a function of the speed of advance of the particles in the cylinder as well as their transverse motions obtained by the adjustment of the respective speeds of the brushes, so as to create elemental volumes of particles in motion, so that their surfaces are as often as possible in the zone in which the treatment agent is sprayed, and turned towards the nozzle.

The following example relating to an operation of continuous treatment of seeds allows the advantages of the process according to the invention as regards the quality of covering of the grains and the productivity of the process to be illustrated.

EXAMPLE

A batch of 24 tons of cleaned and sifted maize, is continuously weighed so as to obtain a constant flow rate, by regulation, of 12 t/hour, and continuously introduced into a horizontal cylinder, through one end, of diameter 600 mm and of length 1 m. The cylinder, seen from the entry and, rotates in the clockwise direction at a speed of 80 rev/min. All the speeds are maintained constant.

The cylinder is equipped, in its lower part (FIG. 3), with two brushes 23, 24 with longitudinal axes parallel to that of the cylinder, made of polyamide, of pitch 100 mm and of diameter 200 mm and tangent to each other. The brushes 23, 24 rotate respectively at 180 rev/min and 100 rev/min. The brush 24 returns the seeds carried by the cylinder to the center. The lengths of the brushes and the wall of the rotating cylinder thus form spaces, in contact with the seeds, with moving walls which mix the seeds in packets and carry them towards the exit of the cylinder, with a well-regulated distribution of dwell time.

Simultaneously, over the continuous flow of the stream of seeds in the bottom of the cylinder, there is continuously sprayed a slurry comprised of a suspension based on a film-forming polymer material, containing a colorant and a fungicidal material, as well as formulation adjuvants "of composition (per 1 liter):

polyvinyl alcohol 20 g
ground clay 200 g
Basoflex Red 385520 ml
(registered trademark)
thiram (fungicide) 100 g"

The slurry is continuously sprayed by five nozzles, fed by a pipe situated above the brushes. The treatment agent thus arrives on the surface presented and renewed by the seeds. The total flow rate through the five nozzles is adjusted to 120 l/hour so as to apply 0.02 l of slurry per kg of seed.

The treatment of 24 tons is performed in two hours. The seeds thus treated emerge wet, with a moistness which is not detrimental to their preservation or to their biological properties, and exhibits a highly regular covering appearance.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed:

1. A process for treating the surface of particles with a treatment agent, comprising:

providing a drum having an interior main wall defining a chamber, the chamber having an outlet;

rotating the drum about a main axis of rotation;

providing first and second generally helical secondary walls within the chamber such that respective first and second secondary axes of rotation of the first and second helical secondary walls are oriented below and substantially parallel to the main axis, and such that the first secondary axis is spaced from the second secondary axis in a direction opposite the direction of rotation of the drum;

supplying the treatment agent into the chamber;

introducing the particles into the chamber such that the particles become disposed within a space bordered by the main wall and the first and second secondary walls; and rotating the first and second secondary walls about the respective first and second secondary axes such that the first secondary wall rotates in the same direction of rotation as the main wall, and the second secondary wall rotates in a direction of rotation opposite the direction of rotation of the main wall, for feeding volumes of the particles continuously in an exiting direction toward the outlet while subjecting the particles to a rotational movement transverse to the exiting direction and simultaneously to a vertical movement.

2. A process according to claim 1, wherein the rotational movement of the particles comprises a rolling motion.

3. A process according to claim 1, wherein the supplying step comprises spraying.

4. A process according to claim 1, wherein the first and second secondary walls comprise helical brushes.

5. A process according to claim 1, wherein the treatment agent is supplied to an initial portion of particle travel in the chamber.

6. A process according to claim 1, wherein the supplying step comprises supplying a liquid treatment agent.

7. A process according to claim 1, wherein the supplying step comprises supplying a powderous treatment agent.

8. A process according to claim 1 including the step of drying the particles after the particles exit the chamber.

9. A process according to claim 1, wherein the introducing step comprises introducing seeds.

10. Apparatus for treating particles with a treatment agent, comprising:

a cylindrical drum rotating about a main axis, said drum having an inlet through which particles are supplied and an outlet through which particles are removed;

distributing means for distributing the treatment agent into said drum;

displacement means for displacing the particles from said inlet to said outlet including first and second generally helical secondary walls disposed within said drum and rotating about first and second secondary axes, respectively, disposed substantially parallel to and below said main axis, said first secondary wall spaced from said second secondary wall in a direction opposite a direction of rotation of said drum; and drive means for rotating said first secondary wall in the same direction of rotation as said drum, and rotating said second secondary wall in a direction of rotation opposite said direction of rotation of said drum, so that particles are transferred between said first and second secondary walls while being contacted by the treatment agent.

11. Apparatus according to claim 10, wherein said distributing means is situated above said axes of said first and second secondary walls for distributing the treatment agent downwardly onto the particles.

12. Apparatus according to claim 10, wherein said first and second secondary walls comprise helical brushes.

13. Apparatus according to claim 10, wherein said drum is perforated.

14. Apparatus according to claim 10, wherein said drum has a circular cross-sectional configuration.

15. Apparatus according to claim 10, wherein said drum has a polygonal cross-sectional configuration.

16. Apparatus according to claim 10, wherein said distributing means comprises a spray nozzle.

17. Apparatus according to claim 10, wherein said distributing means comprises a powder dispenser.

18. Apparatus according to claim 10 including conveying means disposed at said outlet for removing the treated articles.

19. Apparatus according to claim 18 including drying means for drying the removed treated particles.

* * * * *